Sept. 29, 1970     R. GUDMESTAD     3,530,746
WIRE STRIPPING APPARATUS
Filed Jan. 5, 1968     7 Sheets-Sheet 7
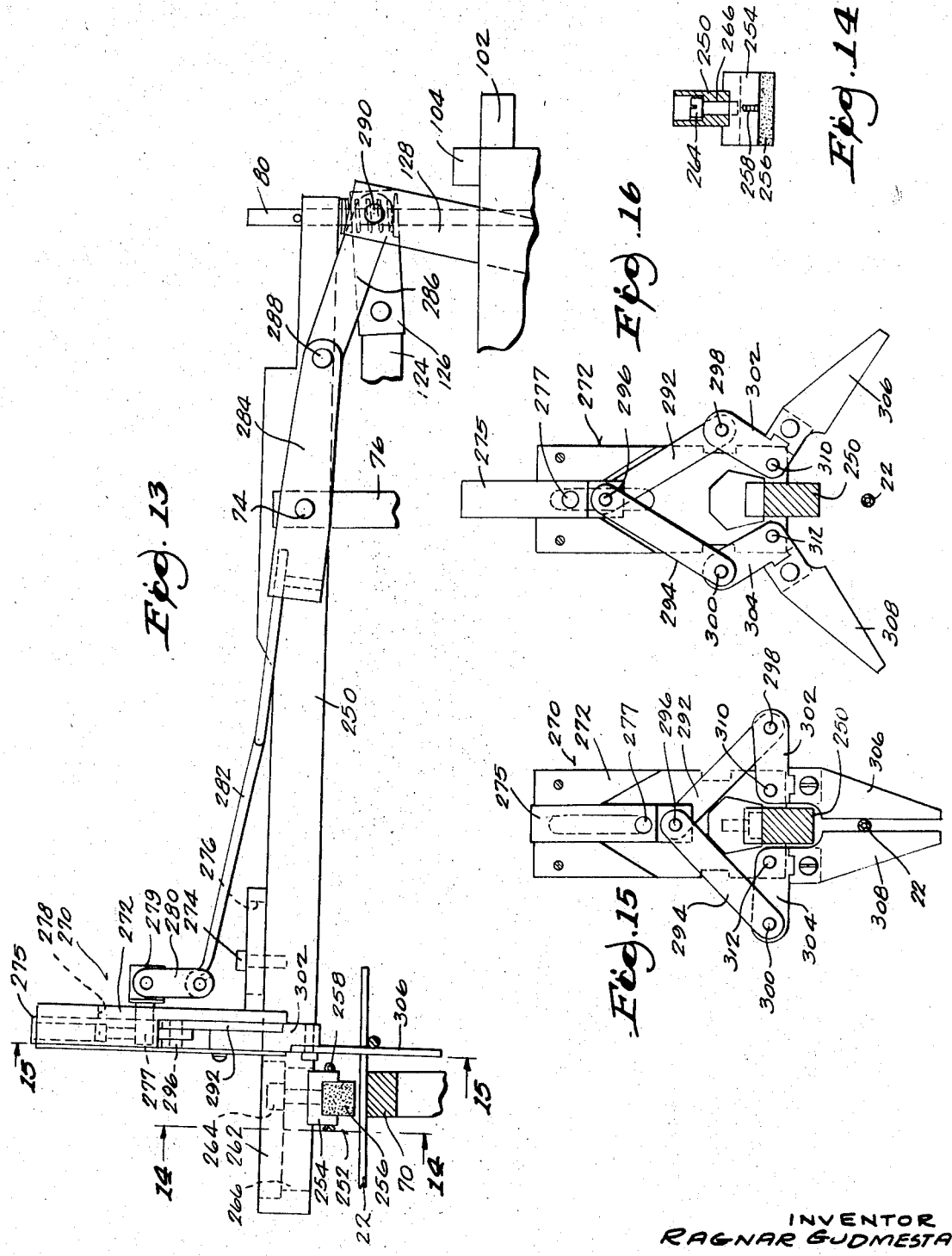
INVENTOR
RAGNAR GUDMESTAD
BY *Lieber & Nilles*
ATTORNEYS United States Patent Office 3,530,746
Patented Sept. 29, 1970

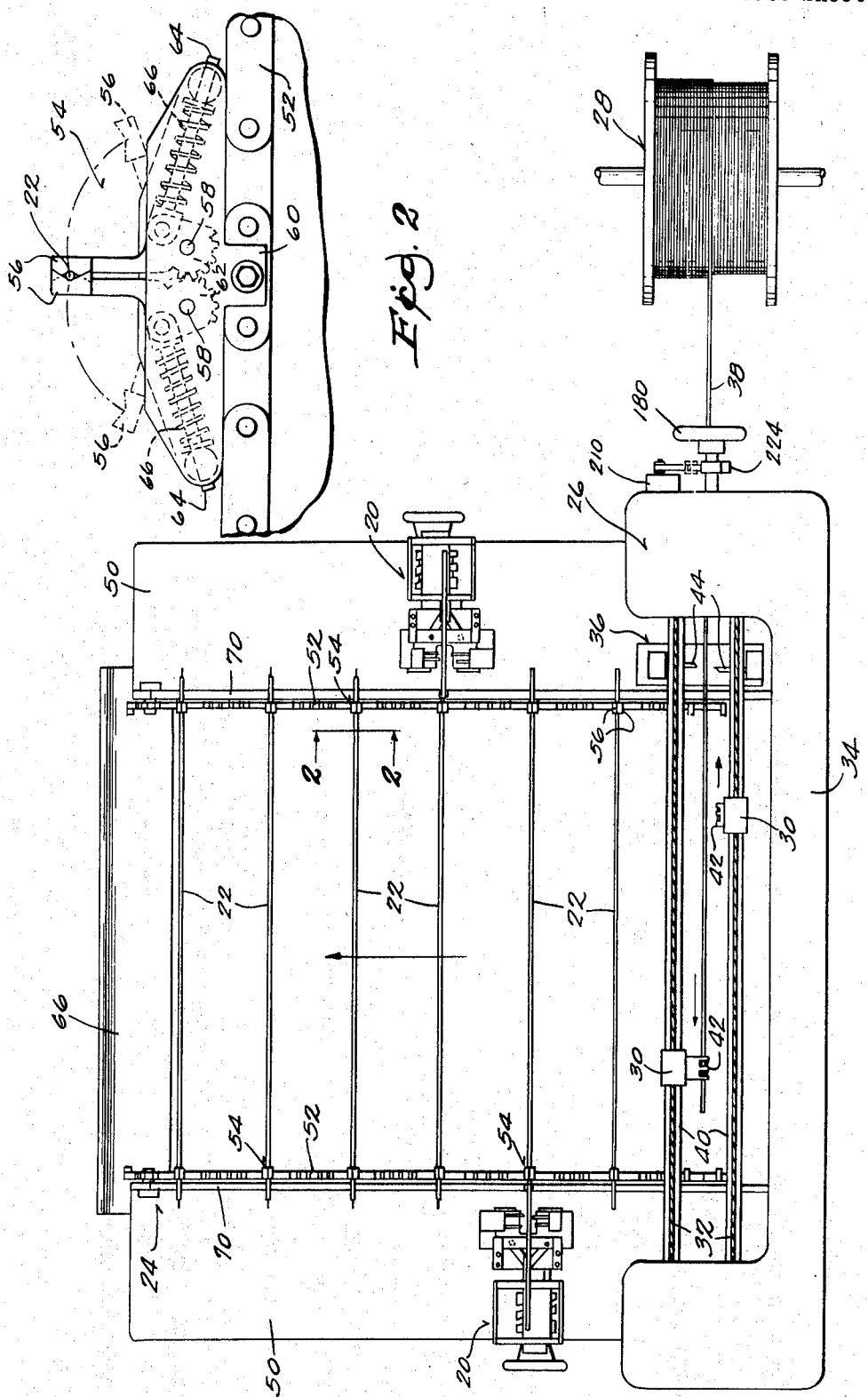

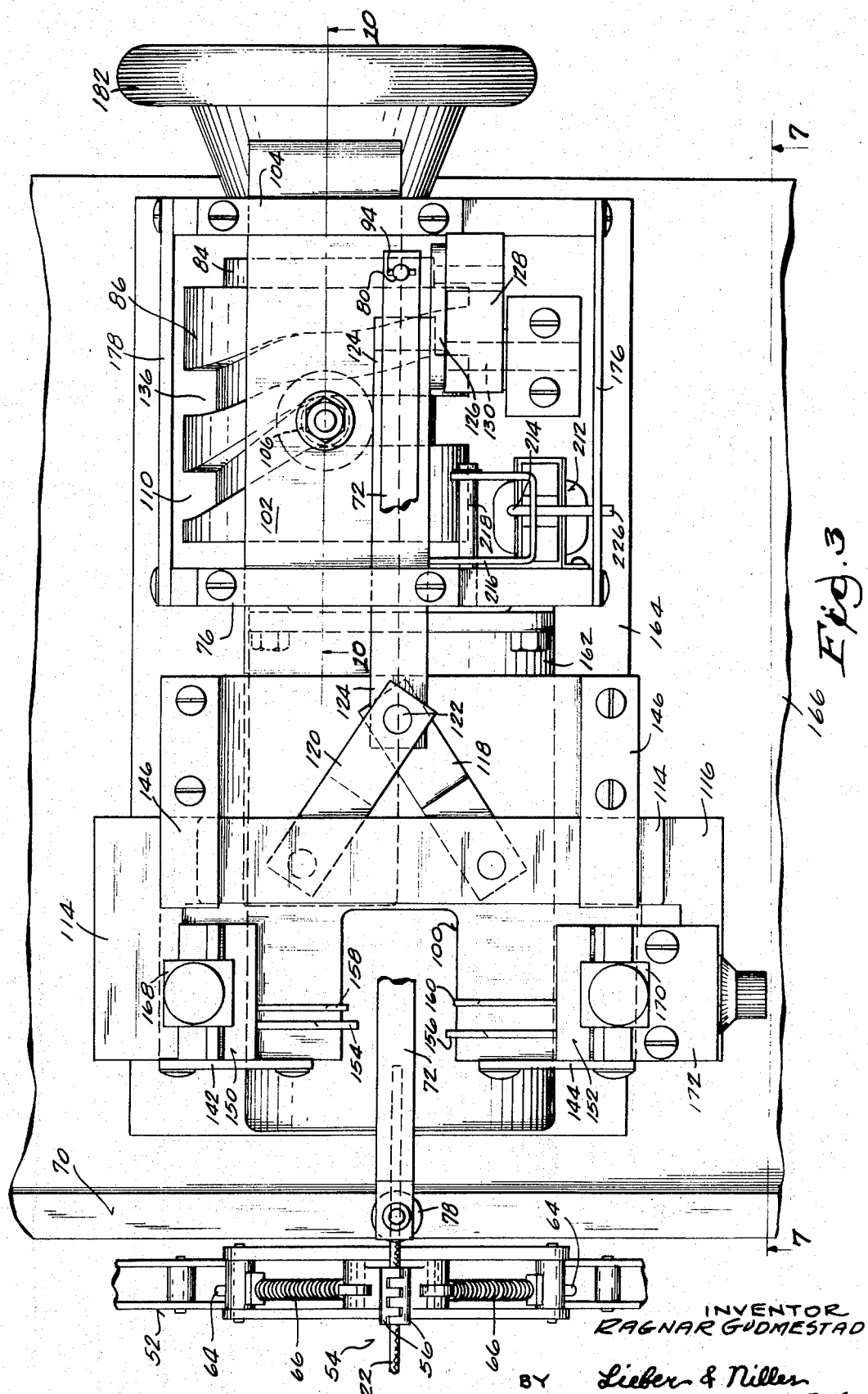

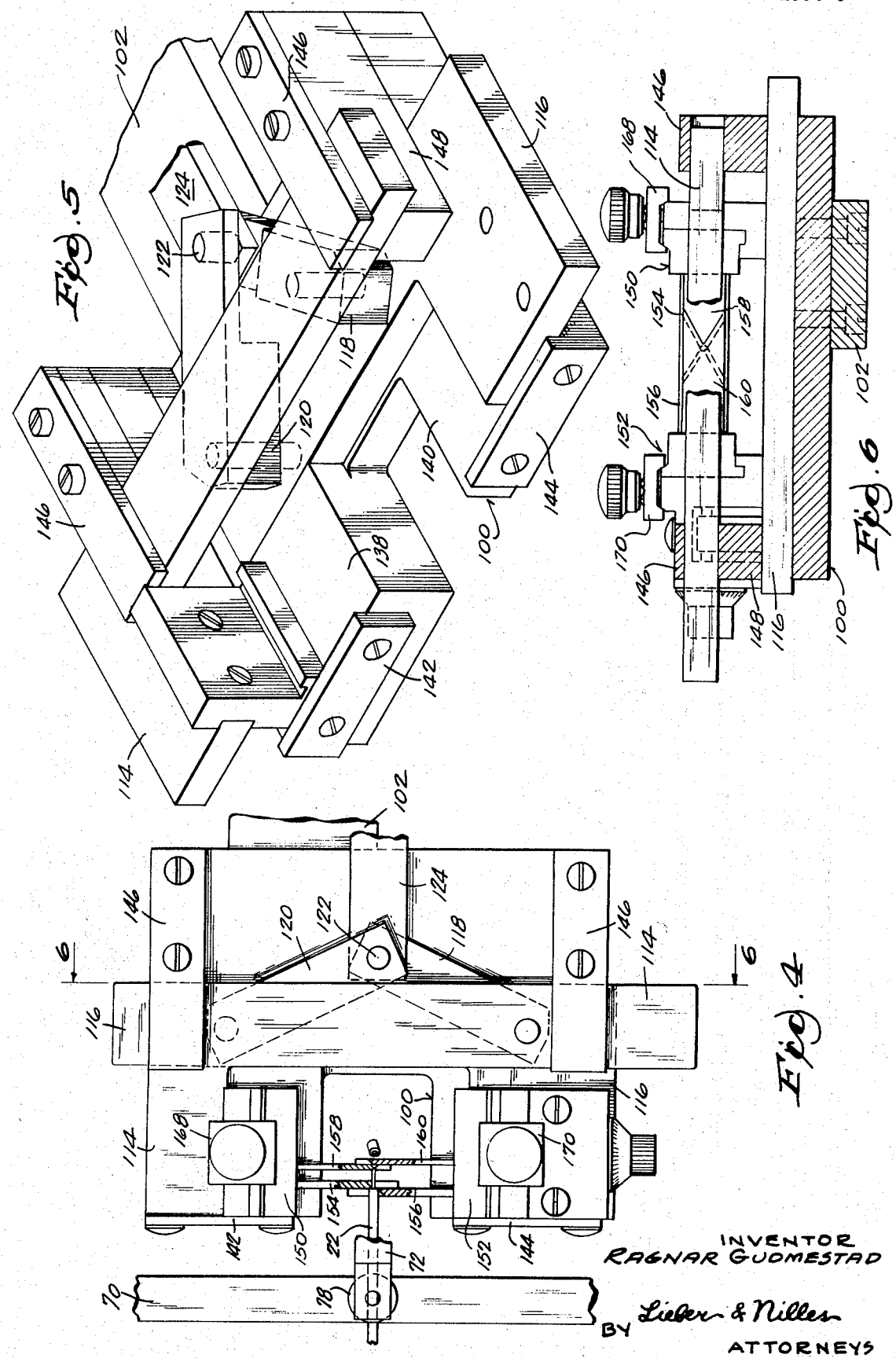

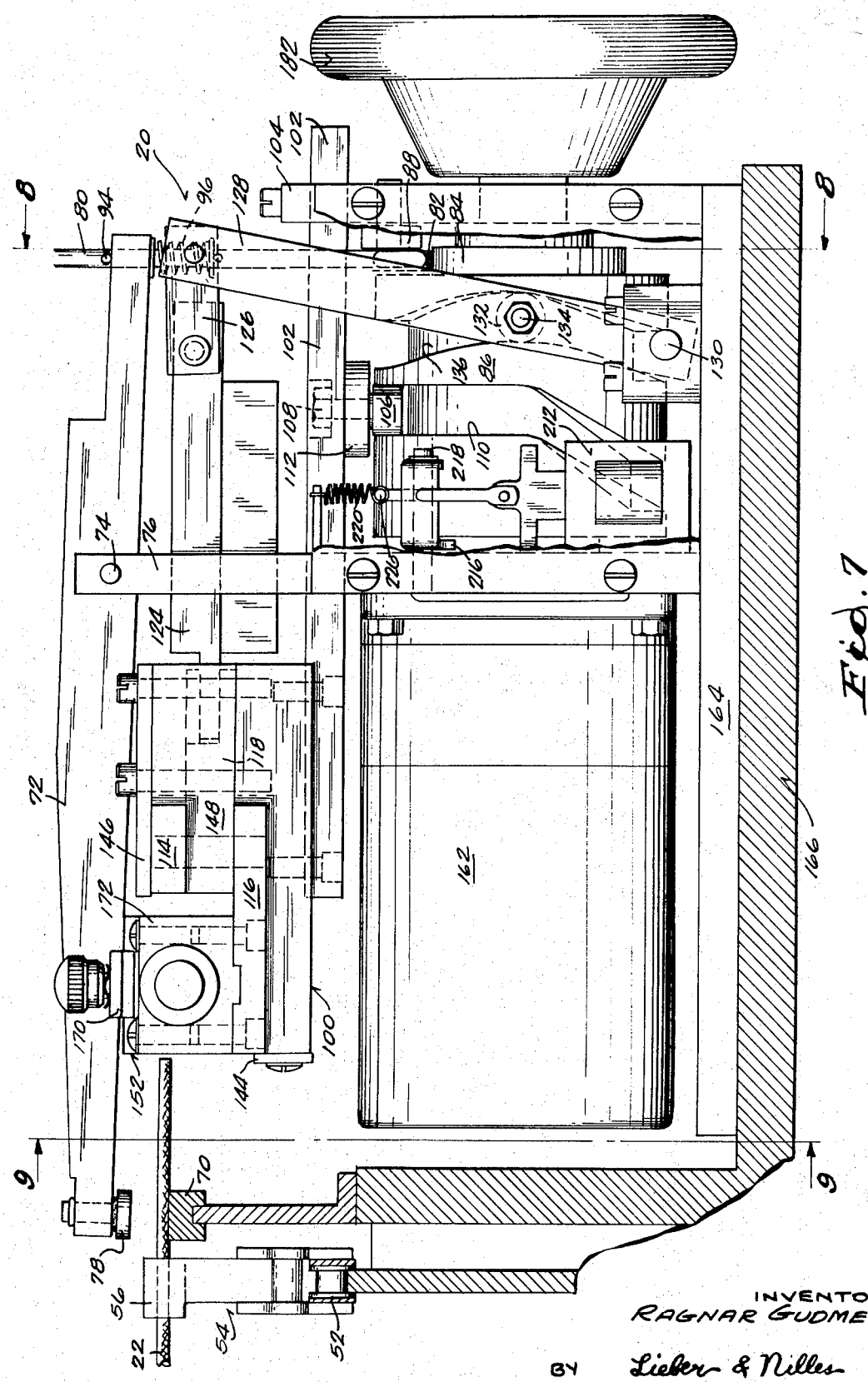

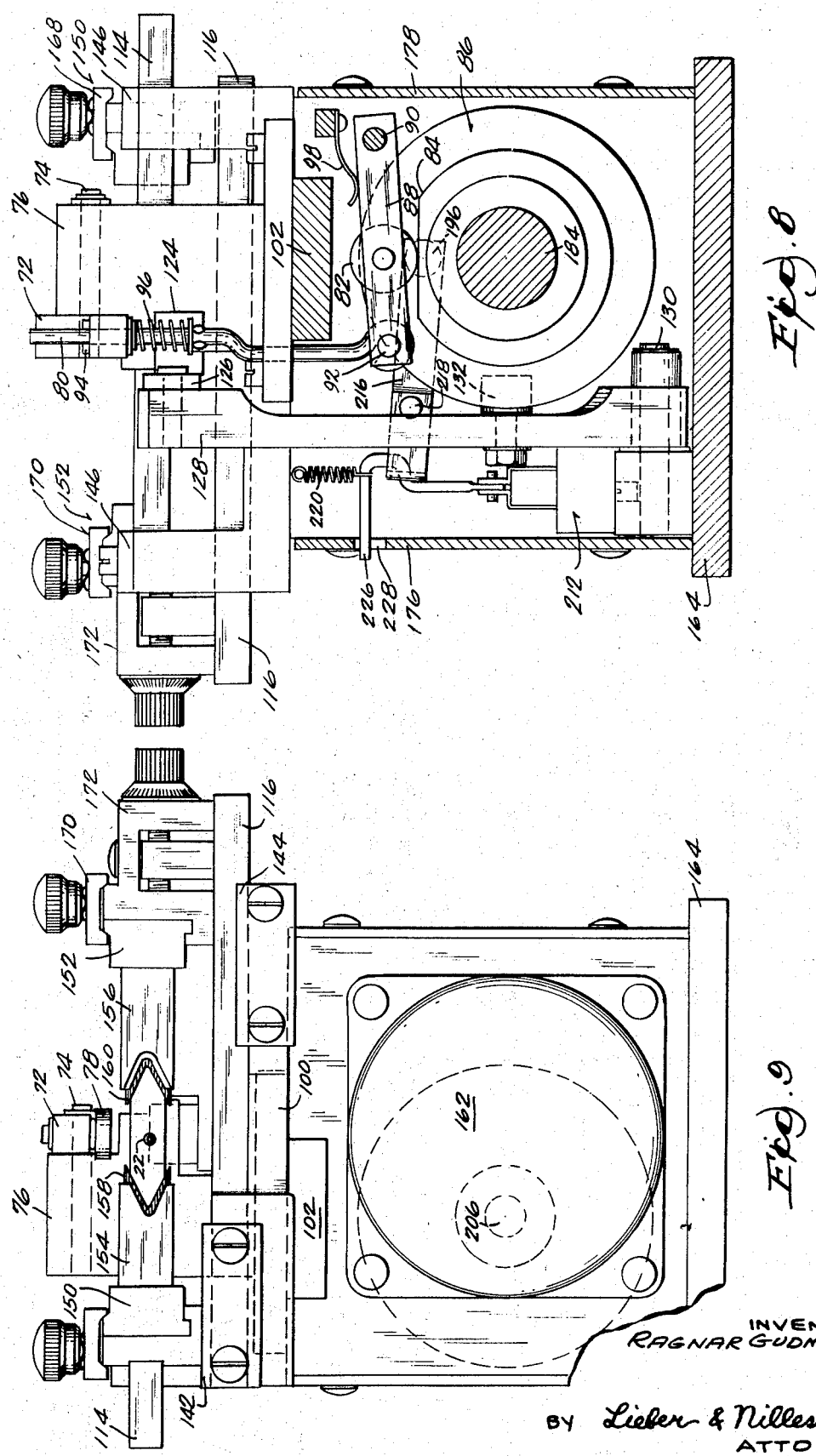

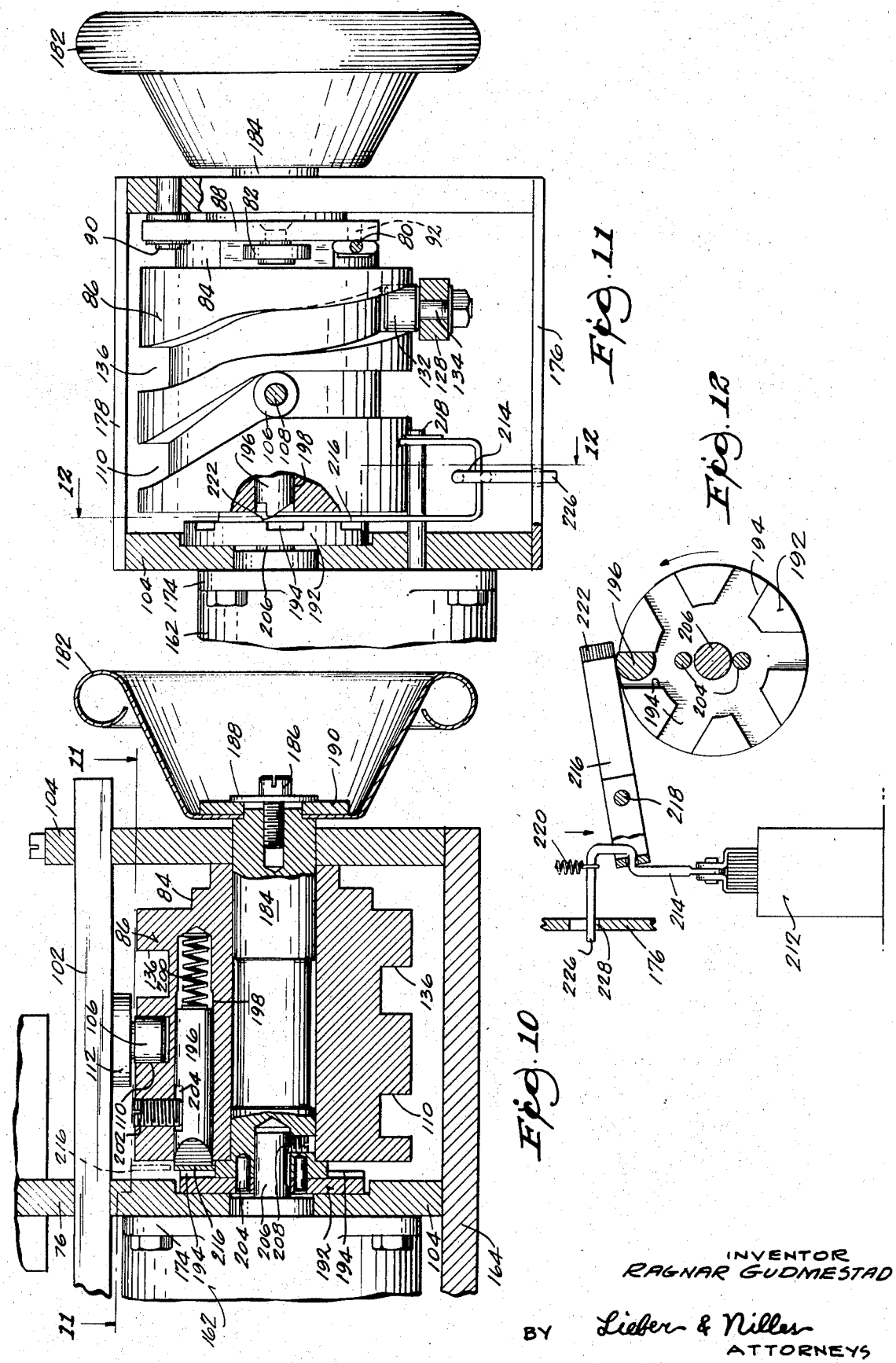

3,530,746
WIRE STRIPPING APPARATUS
Ragnar Gudmestad, West Allis, Wis., assignor to Artos Engineering Company, New Berlin, Wis., a corporation of Wisconsin
Filed Jan. 5, 1968, Ser. No. 695,998
Int. Cl. H02g 1/12
U.S. Cl. 81—9.51                                    19 Claims

ABSTRACT OF THE DISCLOSURE

This device relates to apparatus operating in timed relation with a wire conveyor for stripping insulation from the ends of successive wire lengths as they are advanced along a predetermined path. The stripping device includes means for clamping the wire as it is advanced to the stripping station by the conveyor, means for moving the open stripping blades axially toward the wire and inwardly of the end thereof, means for closing the blades onto the wire, and means for thereafter moving the closed blades axially away from the wire beyond its stripped end while the wire clamp remains effective.

BACKGROUND

Various machines have heretofore been proposed for stripping insulation from the ends of electrical wire to permit attachment of electrical terminals to the stripped ends. These prior devices have employed a number of different techniques for actuating the wire delivery and wire clamping mechanisms as well as the stripping blades. These machines have also enjoyed varying degrees of commercial success and acceptance in the trade.

In some of the prior wire strippers, the wire has been fed to the stripping blades from a supply reel as a continuous strand. The strand is then cut to the desired length, and the insulation is simultaneously severed at spaced locations on opposite sides of the wire cut-off. Then, as the stripping blades are held in position, the wire is pulled axially away from the blades in opposite directions to thereby simultaneously remove the severed lengths of insulation on both sides of the cut-off.

In other stripping apparatus, the continuous wire strand as fed from the supply roll is cut to desired lengths, and the successive lengths are then advanced to the stripping zone. In the stripping zone, one or both ends are stripped by moving the wire into position between open stripping blades, closing the blades to sever the insulation, and finally moving the wire outwardly away from the closed blades to remove the severed length of insulation from each end of the wire independently.

In still other instances, the wire is fed to the stripping blades either as a continuous strand or in successive pre-cut lengths as hereinabove described, and the stripping blades are then actuated to sever the insulation in predetermined areas. However, instead of pulling or moving the wire outwardly from the closed stripping blades, the wire is held against movement while the blades are moved axially away from the end of the wire to thereby strip the insulation therefrom.

Despite the fact that some of these previously available wire stripping machines have been placed in relatively widespread use, they have, nevertheless, generally possessed certain inherent objections and disadvantages. In many cases, the apparatus has been overly complicated and costly with excessive numbers of moving parts, thus requiring careful assembly and maintenance by highly skilled technical personnel. Then too, these machines have been undesirably restricted in their application and use, requiring special auxiliary equipment and plant layout. Also, the various mechanical movements employed in some of these prior devices have been difficult to adjust and time with the required preciseness and accuracy. In addition, many of the machines have been heavy and bulky, requiring an objectionable amount of floor space while rendering the same anything but portable.

SUMMARY

It is therefore an object of the prevent invention to provide a novel and improved wire stripper which is relatively simple and compact in construction, highly efficient in operation, and which requires a minimum of maintenance.

Another object of this invention is to provide an improved wire stripping apparatus which is extremely flexible in its use and adaptations, and which may be manufactured and sold at reasonably low cost.

Still another object of the invention is to provide an improved wire stripper embodying wire trimming means which may be utilized in conjunction with a wire conveyor adapted to transport successive wire lengths through a plurality of work performing zones and to deposit the finished terminal strips in a neat and orderly manner at a collecting station, the wire stripper being capable of installation and use at any desired work station or zone and on either side of the conveyor for stripping one or both ends of the successive wire lengths simultaneously, alternately or otherwise.

A further object of the invention is to provide an improved wire stripping machine in which the wire clamping means, the blade carrier, and the blade actuating means are all operable in precisely timed relation by a single actuator driven from a common source of power.

In accordance with the present invention, wire stripping apparatus is provided which comprises, means operable to clamp an insulated wire in position wherein the end thereof extends axially away form the clamped portion, carrier means mounted for reciprocation in a plane parallel to the wire axis, cooperable stripping blades mounted on the carrier for reciprocation transversely of the plane of movement of the carrier, means for moving the carrier to a predetermined extent toward the clamped wire with the stripping blades spaced apart, means for simultaneously moving the stripping blades to closed position about the extending end of the wire to sever the insulation as the carrier reaches the extent of its movement, and means for moving the carrier away from the clamped wire as the stripping blades remain closed to thereby strip the severed insulation from the end of the wire.

These and other objects and advantages of the invention will become apparent from the following detailed description.

DRAWINGS

A clear conception of the several features constituting the invention, and of the details of construction and mode of operation of a typical wire stripping machine embodying the improvements, may be had by referring to the drawings accompanying and forming a part of this specification, wherein like reference characters designate the same or similar parts in the various views.

FIG. 1 is a plan view illustrating a pair of the improved wire stripping machines operating on opposite ends of a succession of wire lengths as they are advanced from a feeding and cut-off device through a plurality of work stations or zones by a typical conveyor;

FIG. 2 is a somewhat enlarged fragmentary view of one of the wire clamping jaws of the conveyor viewed in the direction of the arrows 2—2 of FIG. 1;

FIG. 3 is an enlarged view taken from the top of one of the wire stripping machines and a fragment of the conveyor, the wire clamp arm of the machine being broken away for the sake of clarity and the stripping blades being shown open prior to movement of the carriage toward the wire;

FIG. 4 is a fragmentary part-sectional top view of the blade carrier portion of the stripping machine showing the blades actuated to closed position;

FIG. 5 is a fragmentary perspective view of the blade carrying portion of the machine but with the blades removed therefrom;

FIG. 6 is a transverse section through the blade carriage taken along the line 6—6 of FIG. 4;

FIG. 7 is a longitudinal section taken generally along the line 7—7 of FIG. 3 to show the wire stripper in elevation;

FIG. 8 is a transverse section through the machine taken along the line 8—8 of FIG. 7;

FIG. 9 is a transverse section taken along the line 9—9 of FIG. 7;

FIG. 10 is a fragmentary section taken generally along the line 10—10 of FIG. 3;

FIG. 11 is another fragmentary part-sectional view taken along the irregular line 11—11 of FIG. 10 but with a portion of the barrel cam being broken away and shown in section for the sake of clarity;

FIG. 12 is a transverse section taken generally along the irregular line 12—12 of FIG. 11;

FIG. 13 is a fragmentary elevational view of a somewhat modified wire clamping assemblage which may be embodied in the wire stripping machine to assure more positive positioning of the wire;

FIG. 14 is a transverse section taken along the line 14—14 of FIG. 13;

FIG. 15 is a section taken along the line 15—15 of FIG. 13 with the clamping fingers of the wire positioner closed; and FIG. 16 is a similar section but showing the clamping fingers open.

DETAILED DESCRIPTION

Referring particularly to FIG. 1 of the drawings, a pair of wire stripping machines embodying the invention and each generally designated by the numeral 20 are illustrated as operating alternately on the opposite ends of wire strands 22 as the strands are advanced in succession along a predetermined path by a wire conveyor 24 which, in turn, receives the sucessive wire strands 22 from a wire feeding and cut-off device 26 adapted to withdraw the wire from a supply reel 28. The conveyor 24 and wire feeding and cut-off mechanism 26, shown herein for purposes of illustration, are generally of the type shown and described in detail in U.S. Pat. No. 3,029,494, issued Apr. 17, 1962 to Karl H. Andren, and reference may be made to such prior patent for structural and operational details which may not fully appear herein.

In general, the wire feeder and cut-off mechanism 26 comprises, a pair of oppositely reciprocable wire feeding clamps 30 secured to a cable 32 driven in a suitable manner to move the clamps 30 longitudinally of the frame 34 back and forth past a wire cutting device 36 located near one end of the frame. The wire stock 38 to be severed into strands 22 of predetermined lengths and converted into conductors is withdrawn from the supply reel 28 past suitable feed control apparatus, and the frame 34 may serve as a convenient support for the propelling motors and wire indexing and driving mechanisms. The continuous insulation covered stock 38 is fed longitudinally through the cut-off zone 36 by means of the clamps 30 which are firmly but adjustably secured to the actuating cable 32 and which may be slidably supported on horizontal beams 40 or the like mounted on the frame 34.

The clamps 30 each have cooperating wire gripping jaws 42 adapted to be openend and closed in timed relation with the various other mechanisms, and in operation, the feed clamps 30 travel in opposite directions past each other and past the cutters without obstruction with one of the clamps closed to grip the wire stock and pull the same to the end of a feed stroke while the other clamp is open and being returned an equal distance in the opposite direction beyond the knives 44 of the cutter 36. At the termination of each feed stroke, the clamp 30 which has passed through and beyond the zone defined by the cut-off device 36 closes and grips the incoming wire stock 38 and feeds a predetermined length thereof past the cut-off knives 44. At the end of each such feeding stroke and while the clamps 30 remains closed, the knives 44 are actuated in a suitable manner to sever a length of strand 22 from the wire stock 38, after which the clamp which has completed its feeding stroke is opened and returned as the other clamp remains closed to feed a successive wire length past the knives 44 as described.

The conveyor 24 for receiving the severed lengths of wire or strands 22 from the feeding device 26 includes a horizontal frame 50 extending laterally from the frame 34 and a pair of endless chain conveyors 52 each traversing a driving sprocket at one end and an idler sprocket at the other end. The endless chains 52 are simultaneously driven in a suitable manner in timed relation with the wire feeding and cut-off mechanism 26 to intermittently advance the same through the several work stations, and each of the chains carries a series of wire grippers 54 spaced apart equal distances so as to maintain the wire strands 22 gripped thereby in parallel relationship.

As shown in FIG. 2, the wire grippers 54 each comprise a pair of jaws 56 mounted on pivot pins 58 carried by a support 60 secured to a selected link of the chain 52. The jaws 56 are inteconnected by gears 62 so as to cause the jaws to swing smiultaneously in opposite directions to and from wire gripping position, and these jaws 56 are also provided with toggle links 64 and springs 66 coacting with the toggles to either hold the jaws open as shown by broken lines in FIG. 2 or to close the jaws as shown by full lines. The jaws 56 of the wire grippers 54 of the two conveyors 52 are simultaneously operated in timed relation with the wire feed and cut-off mechanism 26 as shown and described in detail in Pat. No. 3,029,494, and as the grippers 54 approach the successive severed strands or lengths of wire 22 in the zone defined by the mechanism 26, the jaws 56 of each pair of grippers are in separated or open position. Then, as each wire severing operating in the zone 26 is completed, the jaws 56 are snapped into closed position to simultaneously grip the severed strands 22, the gripped strands being carried in succession through the several work performing zones or stations to a final collecting trough 66 by the conveyors 52.

In accordance with the present invention, means are provided laterally adjacent to each of the conveyor chains 52 for supporting the portion of the wire to be stripped or otherwise operated upon and extending outwardly from the grippers 54, and such support means is shown as constituting a rail 70 extending parallel to each of the chains 52. As will hereinafter appear, each of these rails not only provides support for the outwardly extending end portions of the successive wire strands 22 but also functions as one of the jaws of the clamping mechanism of the wire stripping apparatus 20.

Each of the wire strippers 20 includes a wire clamp comprised of a lever 72 pivotally mounted at a medial portion for swinging movement about a pivot 74 carried by a stationary upright support 76, the swinging end of the lever 72 having a pad 78 constituting a clamping jaw cooperable with the rail 70 for firmly clamping the outwardly extending portion of the wire strand 22 to be stripped as the strand is advanced to the stripping station. The lever 72 is actuated in timed relation with the conveyor 24 and the chains 52 thereof by means of a cam follower which includes an arm 80 cooperable with the end of the lever 72 remote from the jaw 78 and responsive to a cam roller 82 operable in a circumferential cam portion 84 of a rotatable barrel type cam 86. The cam roller 82 rides along the circumferential portion 84 of the rotatable cam 86 which is of variable diameter, and movement is imparted to the arm 80 through a lever 88 swingable about a pivot 90 and having its swinging end hingedly attached at 92 to the lower end of the arm 80, the cam roller 82 being carried by a medial portion of the lever 88 as shown in FIG. 8. Thus, as the barrel cam 86 is caused to rotate, the diameter of the cam portion 84 thereof acts on the cam follower roller 82 and transfers motion to the wire clamp lever 72 through the arm 80 to thereby swing the lever 72 about its pivot 74 into and out of clamping engagement with the successive wire strands 22 as they are fed to and from the stripping zone. The arm 80 is preferably connected to the end of the lever 72 through a loose connection to compensate for possible overtravel of the lever, the connection being shown as comprising a transverse retaining pin 94 coacting with the upper surface of the lever 72 and a spring 96 retained under compression and acting on the lower surface of the lever 72 in opposition to the pin 94. Also, suitable means such as a spring 98 may be provided for constantly urging the cam roller into engagement with the cam portion 84 so as to respond to the diameter thereof.

Operable in timed relation with the clamp 72, 78 is a slide bar assembly or carrier 100 mounted for reciprocation in a plane parallel to the axis of the end of a wire strand 22 clamped in position by the jaw 78 and rail 70. The carrier 100 is mounted on a slide bar 102 suitably guided for reciprocation in aligned guide openings formed in upright frame members 104. The slide bar 102 carries a cam roller 106 which is suitably attached to the bar 102 as by means of a bolt 108. The cam follower roller 106 depends from the bar 102 and may be spaced therefrom by a spacer 112 so as to ride in a sinuous outwardly open annular groove 110 formed in the cam barrel 86.

Thus, the bar 102 and cam follower roller 106 cooperate to provide a means for reciprocating the carrier 100 toward and away from the end of a wire strand 22 responsive to the curvature of the sinuous groove 110 and in timed relation with the operation of the lever 72 by the cam 84 and cam follower means 80, 82. It will be understood that when the clamping lever 72 and its gripping jaw 78 is raised or open, the carrier 100 is in retracted position out of the path of movement of the protruding ends of the wire strands 22 as shown in FIG. 7. Then, as a wire strand 22 reaches the stripping zone and advancement of the conveyer chains 52 is interrupted, the cam follower means 80, 82 acting in response to the diameter of the cam portion 84 causes the lever 72 to swing counterclockwise as viewed in FIG. 7 so that the gripping pad 78 thereof cooperating with the rail 70 firmly clamps the wire strand 22 in position for the stripping operation. At this same moment, the slide bar assembly or carrier 100 is caused to move toward the outwardly extending end of the wire strand 22 through the action of the slide bar 102 and cam roller 106 operating in the cam groove 110 of the barrel cam 84. Since the cam groove 110 to which the carrier 100 is responsive and the cam groove or portion 84 to which the lever 72 is responsive are formed on the same rotatable cam barrel and are therefore revolved together, it follows that these elements operate in precisely timed relation.

Mounted on the carrier 100 are a pair of blade holder slides 114, 116, the blade holder slides being guided for reciprocation transversely of the plane of movement of the carrier 100. These slides 114, 116 are connected by a pair of toggle levers 118, 120 respectively, the levers 118, 120 being secured at their common ends by means of a pivot 122 to the end of a slide actuating rod 124. In turn, the slide actuating rod 124 is connected through a link 126 to the upper end of an actuating lever 128 pivotally mounted for swinging movement at 130 remote from its connection to the link 126, the medial portion of the lever 128 being provided with a cam follower roller 132. The cam follower roller 132 may be attached to the lever in any suitable manner as by means of a bolt 134 so as to project laterally from the lever 128 into a sinuous cam groove 136 also formed in the barrel cam 86.

Thus, as the barrel cam 86 is rotated, the follower roller 132 riding in the sinuous cam groove 136 causes the lever 128 to swing about its pivot 130 responsive to the curvature of the groove 136, and the swinging movement of the lever 128 is transmitted through the link 126 to the rod 124 and through the toggle 118, 120 to the blade holder slides 114, 116 to reciprocate the same toward and away from each other. Again, the sinuous groove 136 is so formed as to maintain the blade holder slides 114, 116 spaced apart until a wire strand 22 has been positioned at the gripping zone, clamped by the pad 78 of the lever arm 72 and the carrier 100 moved toward the protruding end of the wire strand 22 and into stripping position. At this time, the toggle levers 118, 120 are actuated by the cam follower to move the slides 114, 116 toward each other, and since the cam groove 136 is again formed in the barrel cam 86 which also includes the cam portion 84 for actuating the clamping lever and the cam groove 110 for reciprocating the carrier 100, the reciprocation of the blade holder slides transversely of the carrier 100 is performed in precisely timed relation to the other operations. The slides 114, 116 may be suitably guided for sliding movement transversely of the plane of movement of the carrier 100 as in ways 138, 140 respectively, and these slides may be retained against lateral displacement from the ways as by means of structural elements 142, 144 and against vertical displacement as by the structural elements 146, 148. Each of the slides 114, 116 is also provided with a stripping blade holder 150, 152 respectively, the holders 150, 152 each having a stripping blade 154, 156 respectively and, if desired, a cut-off or trimming blade 158, 160 extending therefrom toward each other. Thus the slides 114, 116 are moved toward each other after a wire strand 22 has been moved into and clamped at the stripping zone and the carrier 100 moved to its fullest extent toward the protruding end of the clamped wire strand 22, whereupon the stripping blades 154, 156 function to cut the insulation inwardly of the end of the wire strip and the trimming blades 158, 160 cooperate to simultaneously completely sever the end of the wire strip a spaced distance from the point where the insulation is severed. With the blades held in this position, the carrier 100 acting in response to the cam 110 is moved away from the end of the wire strip 22 and the portion of the insulation severed by the blades 154, 156 is removed to bare the end of the wire. After the wire has been thus stripped, the blade holder slides are caused to spread apart and the wire clamping lever 72 is opened to permit free movement of the wire strand away from the stripping zone and to the next succeeding work zone. Simultaneously, a successive wire strand to be stripped is brought into the stripping zone by the conveyor and a subsequent stripping operation is performed.

The barrel cam 86 may be driven in any suitable manner as by a gear head motor 162, and the entire mechanism may be conveniently mounted on a base plate 164 or the like so as to be entirely self-contained. The wire stripping apparatus may be conveniently positioned in any suitable manner laterally of the conveyor 24 and one or the other or both of the conveyor chain 52 thereof, the device shown herein being illustrated as mounted on a support 166 extending laterally from the support for the rail 70. The tool holders 150, 152 may, of course, be of any suitable construction, but these tool holders are shown herein as being removably clamped in position by manually operable clamps 168, 170 respectively with one or the other of the blade holders being manually adjustable as by a slide mechanism 172 toward and away from the other blade holder. The motor 162 may be mounted as by means of a bracket 174 on the upright 104, and the barrel cam and its associated mechanism 104 may be concealed by side cover plates 176, 178 if desired.

As hereinabove indicated and as described in detail in Pat. No. 3,209,494, the wire grippers 30 of the feeder 26 are adjustable along the cable 32 and the cut-off mechanism 36 is adjustable by means of the hand wheel 180 to feed and sever the desired lengths of wire supplied from the reel 28. Mechanism is also provided for adjusting the barrel cam 86 so as to operate in synchronism with the wire feeder and cut-off and the conveyor 24 and chains 52 thereof. Referring particularly to FIG. 10, such mechanism comprises a hand wheel 182 secured to the shaft 184 which freely carries the barrel cam 86, the hand wheel being attached to the end of the shaft 184 in any suitable manner as by means of a screw 186 and clamping washers 188, 190. The opposite end of the shaft 184 carries a clutch disc 192 provided with an annular series of indexing and clutch engaging notches 194. These notches 194 are engageable by the tapered end of a clutch pin 196 confined in a bore 198 formed in the body of the cam 86 laterally offset from the shaft 184, the pin 196 being constantly resiliently urged by a compression spring 200 toward the indexing notches 194. The tapered pin 196 is guided in its longitudinal movement as by means of a set screw 202 or the like having the inner end thereof confined in a slot 204 in the pin 196, and the barrel cam 86 is freely carried by the shaft 184 as aforesaid with the disc 192 being keyed to the shaft as by means of pins 204, the shaft 184 in turn being keyed to the motor shaft 206 as by a set screw 208 for rotation therewith. Thus, by manually rotating the shaft 184 by means of the hand wheel 182, the pin 196 can be brought into engagement with one of the indexing notches 194 so as to index the barrel rotation in timed relation with the wire feeder and cut-off 26 and conveyor 24.

After proper adjustment have been effected, the on-off switch 210 may be turned on thus starting the motor for operating the feeding and cut-off mechanism 26 and conveyor 24 as well as the motor 162. A solenoid 212 which has its upwardly extending arm 214 operably coacting with a clutch actuator or pin pull-out lever 216 is then intermittently energized, as by a suitable switch under the control of a cam 224 operating in timed relation to the feeding and cut-off device 26. The lever 216 is pivoted at 218 and is constantly resiliently urged by a spring 220 acting through arm 214 of the solenoid to a position wherein the free tapered end 222 thereof covers the indexing notches 194 of the clutch disc 192 to maintain the pin 196 disengaged therefrom as shown in FIG. 11. However, upon energization of the solenoid 212, the lever 216 is tripped to the position shown in FIG. 12 to thereby permit the spring pressed clutch pin 196 to move to the left as viewed in FIGS. 10 and 11 and thereby engage the next successive notch 194 of the disc 192. With the motor 162 operating to drive the clutch disc 192 through the connections 204 and 208 with the shaft 184, the barrel cam is caused to rotate with the disc 192.

With the mechanisms properly timed, the wire 38 is picked up by a selected one of the grippers 30 and carried past the cut-off device 36. As described in Pat. No. 3,029,494, the wire cut-off knives 44 are operated as the feeding gripper 30 reaches the extent of its stroke, and the severed strands 22 are successively picked up by the jaws 56 of the wire grippers 54 and are intermittently fed to successive operating stations, including the stripping station provided by the stripping apparatus 20, in a timed intermittent manner. The barrel cam 86 then causes operation of the wire clamp lever 72, the slide carriage 100, and the slides 114, 116 as well as the blades carried thereby, all in precisely timed relation to the wire feeding and conveying devices. At the end of each complete cycle, the clutch pin pull-out lever 216 is caused to return to the path of the clutch pin 196 by action of the spring 220, thereby disengaging the clutch with the motor 162 continuing to run until the next cycle as determined by energization of the solenoid 212. It is preferable to also extend the upper end 226 of solenoid link 214 outside of the housing as through a slot 228 provided in the side wall 176 to thereby permit manual tripping of the clutch as for re-setting operations.

Referring now to FIGS. 13 to 16, a wire clamping lever assembly is shown which provides for accurate guiding and positioning of the wire at the clamping zone. In the embodiment shown, the wire clamping bar or lever 250 corresponds to the lever 72 hereinabove described with respect to FIGS. 1 to 12, and since the function and operation of this lever has been described in detail, further description is unnecessary.

However, in the modification, the lever bar 250 has been provided with an adjustable wire clamping pad assembly 252 which replaces the pad 78. As shown in FIGS. 13 and 14, the pad assembly 252 comprises an inverted U-shaped bracket 254 which holds a resilient wire clamping pad 256 between its depending legs, the pad 256 being formed of any suitable rubber-like material such as urethane and being secured in position as by means of a cotter-pin 258 or the like. The upper face of the pad holder 254 is cut away to provide a transverse groove 260, and this groove is slidably received by a reduced end portion 262 of the lever bar 250 for adjustment therealong. Suitable means such as an adjustment screw 264 extending through a slot 266 in the reduced portion 262 of the lever 250 retains the clamping pad asembly 252 in adjusted position so that the pad 256 will properly cooperate with the conveyor rail 70 to effectively hold the wire 22 as it is fed thereto.

The device shown in FIGS. 13 to 16 also embodies a wire positioning assembly 270 carried by the wire clamping lever 250 and actuated by the lever 128 an cam follower 132. This wire positioning assembly comprises generally an L-shaped frame 272 adjustably secured to the lever bar 250 as by means of an adjusting screw 274 extending through a slot 276 in the horizontal leg of the frame 272. Slidably mounted in the vertical leg of the frame 272 is a slide bar 275 which carries a pin 277 having a portion extending through a longitudinal slot 278 in the vertical leg of frame 272. The bar 275 is guided for sliding movement along the vertical leg of frame 272, and the outer end of the pin 277 has a flattened head 279 pivotally receiving one end of a link 280, the other end of which is secured to an end of a spring steel formed rod 282. The spring steel rod 282 is connected to and carried by a lever 284 pivotally mounted at 74 (which is also the pivot for lever bar 250). The lever 284 is swingable about the pivot 74 by a link 286 having one end pivotally secured at 288 to the lever 284 and having the other end pivotally secured at 290 (which is also the pivot for link 126) to the lever arm 128.

Thus, as the lever 128 is swung by the action of the cam follower 132 as hereinabove described, the slide bar 275 is actuated. For example, swinging movement of lever 128 in a counterclockwise direction swings the link 286 and pin 288 upwardly. The lever 284 is thereby swung counterclockwise about its pivot 74 carrying the spring steel rod 282 with it. The rod 282 acting through the link 280 thus moves the slide bar 275 downwardly through its connection 277, 279 with the link 80. Conversely, swinging movement of the lever 128 in a clockwise direction swings link 286 and pin 288 downwardly, thereby swinging lever 284 and rod 282 clockwise and moving slide bar 275 upwardly.

The slide bar 275 carries the common ends of a pair of toggle links 292, 294 by means of pivot pin 296, and opposite ends of the links are pivotally secured by pins 298, 300 respectvely to the outwardly extendng arms 302, 304 of a pair of cooperating wire clamps 306, 308 which are pivotally mounted at 310, 312 respectively on the vertical leg of the frame 272. Accordingly, when the slide bar 275 is moved downwardly as described, the wire clamps 306, 308 are actuated by the toggle levers 292, 294 to wire clamping position as shown in FIG. 15. and when the slide bar 275 is raised, the clamps 306, 308 are opened, as in FIG. 16, to release the wire. The wire is thus positively positioned for clamping between the pad 256 and rail 70 as it is fed into position. As shown, the slide bar 275 and its attendant mechanism may be covered by a plate 314 if desired.

While the improved wire stripping apparatus has been shown and described herein as being operably associated with wire feeding and cut-off and wire conveying mechanism of a particular type with the several elements of the wire stripping apparatus being actuated in a particular manner in timed relation to the wire feeding and cut-off and wire conveyor, it is not intended to unnecessarily limit the invention to the particular combination shown or to the manner of operation thereof since various modifications within the scope of the appended claims may occur to persons skilled in the art.

Various modes of carrying out the invention are contemplated as being within the scope of the following claims particularly pointing out and distinctly claiming the subject matter which is regarded as the invention.

I claim:

1. Wire stripping apparatus comprising, means operable to clamp an insulated wire advanced to a stripping zone in position within said zone with the end of the wire extending axially away from the clamped portion thereof, said means for clamping the wire being periodically actuated to clamp and release the end portions of successive wire strands advanced to said stripping zone, carrier means mounted for reciprocation in a plane parallel to the axis of the clamped end of the wire, cooperable stripping blades mounted on said carrier for reciprocation transversely of the plane of movement of said carrier, means for moving said carrier to a predetermined extent toward the clamped wire with said stripping blades spaced apart, means for simultaneously moving said stripping blades to closed position about the extending end of the wire to sever the insulation as said carrier reaches the extent of its movement, and means for moving the carrier away from the clamped wire as said stripping blades remain closed to thereby strip the severed insulation axially from the end of the wire, said carrier and stripping blades being reciprocated in timed relation to the actuation of said means for clamping said wire, said reciprocation and clamping being accomplished by a single actuating means.

2. Wire stripping apparatus according to claim 1, wherein the wire is advanced to the stripping zone by a conveyor, and means for supporting the portion of the wire to be clamped, whereby said supporting means constitutes one of the wire clamping elements.

3. Wire stripping apparatus according to claim 1, wherein the means for actuating the wire clamp includes a rotatable cam.

4. Wire stripping apparatus according to claim 3, wherein the means for reciprocating the carrier includes a rotatable cam mounted on a common shaft with the clamp actuating cam and rotatable simultaneously therewith.

5. Wire stripping apparatus according to claim 3, wherein the means for reciprocating the stripping blades transversely of the plane of movement of the carrier includes a rotatable cam mounted on a common shaft with the clamp actuating cam and rotatable simultaneously therewith.

6. Wire stripping apparatus according to claim 1, wherein a rotatable barrel cam provides the means for actuating the wire clamp, reciprocating the carrier and reciprocating the blades in timed relation.

7. Wire stripping apparatus according to claim 6, wherein the rotatable barrel cam has a circumferential groove of variable diameter, and the wire clamp includes a pivotally mounted lever and a cam follower responsive to the diameter of the groove for swinging the clamp about its pivot into and out of clamping engagement with the wire.

8. Wire stripping apparatus according to claim 6, wherein the rotatable barrel cam has a sinuous annular groove, and the carrier includes a bar guided for sliding movement and a cam follower responsive to the curvature of the groove for reciprocating the carrier toward and away from the wire.

9. Wire stripping apparatus according to claim 6, wherein the rotatable barrel cam has a sinuous annular groove, and the stripping blades are carried in holders slidably mounted on the carrier and actuated by a cam follower responsive to the curvature of the groove for simultaneously reciprocating said holders and blades toward and away from each other.

10. Wire stripping apparatus according to claim 1, wherein a rotatable barrel cam having a circumferential groove of variable diameter and a pair of axially spaced sinuous annular grooves is provided for actuating the wire clamp, reciprocating the carrier and reciprocating the blades in timed relation, said wire clamp being actuated in response to the variations in the diameter of the circumferential groove, said carrier being reciprocated in response to the curvature of one of the sinuous grooves and said blades being reciprocated in response to the curvature of the other sinuous groove.

11. Wire stripping apparatus according to claim 10, wherein the wire clamp is carried by a pivotally mounted lever, and the clamp actuating means includes a cam follower interposed between the lever and the circumferential groove of variable diameter for swinging said clamp about its pivot into and out of clamping engagement with the wire.

12. Wire stripping apparatus according to claim 10, wherein the carrier is supported on a bar guided for sliding movement, and the means for reciprocating said carrier includes a cam follower interposed between said bar and one of the sinuous grooves.

13. Wire stripping apparatus according to claim 10, wherein the blades are mounted in holders guided for sliding movement on the carrier, and the means for simultaneously reciprocating said holders includes a cam follower interposed between said holders and one of the sinuous grooves.

14. Wire stripping apparatus according to claim 13, wherein the means for reciprocating the blade holders includes a toggle connection between said holders and the cam follower.

15. Wire stripping apparatus according to claim 1, wherein the means operable to clamp the wire within the stripping zone includes wire positioning means and a wire holding clamp.

16. Wire stripping apparatus according to claim 15, wherein both the wire positioning means and the wire holding clamp are adjustably mounted on a common carrier member.

17. Wire stripping apparatus according to claim 15, wherein the wire positioning means includes a pair of cooperating wire clamps actuated by a slide member.

18. Wire stripping apparatus according to claim 17, wherein the slide member is actuated by a rotatable cam.

19. Wire stripping apparatus according to claim 18, wherein the stripping blades are actuated by the same rotatable cam as actuates the slide members.

References Cited

UNITED STATES PATENTS 3,029,494   4/1962   Andren.
3,283,398   11/1966   Andren _____ 81—9.51 X

FOREIGN PATENTS 792,556   8/1968   Canada.

ROBERT C. RIORDON, Primary Examiner
R. V. PARKER, Jr., Assistant Examiner